United States Patent
Bonessio

(10) Patent No.: US 11,300,176 B2
(45) Date of Patent: Apr. 12, 2022

(54) VIBRATION ABSORBING METAMATERIAL APPARATUS AND ASSOCIATED METHODS

(71) Applicant: METAseismic, Inc., Irvine, CA (US)

(72) Inventor: Noemi Bonessio, Irvine, CA (US)

(73) Assignee: METAseismic, Inc., Irvine, CA (US)

( * ) Notice: Subject to any disclaimer, the term of this patent is extended or adjusted under 35 U.S.C. 154(b) by 0 days.

(21) Appl. No.: 17/087,875

(22) Filed: Nov. 3, 2020

(65) Prior Publication Data
US 2021/0140511 A1     May 13, 2021

Related U.S. Application Data

(60) Provisional application No. 62/931,805, filed on Nov. 7, 2019.

(51) Int. Cl.
*F16F 15/04*     (2006.01)
*F16F 15/02*     (2006.01)

(52) U.S. Cl.
CPC ............ *F16F 15/04* (2013.01); *F16F 15/021* (2013.01); *F16F 2230/36* (2013.01); *F16F 2230/40* (2013.01)

(58) Field of Classification Search
CPC .... F16F 15/021; F16F 15/073; F16F 2230/36; F16F 2230/40; E04B 1/36
See application file for complete search history.

(56) References Cited

U.S. PATENT DOCUMENTS

| | | | | |
|---|---|---|---|---|
| 3,921,240 A | * | 11/1975 | Fyfe | E01D 19/047 |
| | | | | 14/73.5 |
| 4,269,011 A | * | 5/1981 | Ikonomou | E02D 27/34 |
| | | | | 52/167.4 |

(Continued)

FOREIGN PATENT DOCUMENTS

| | | | | |
|---|---|---|---|---|
| CN | 110616811 A | | 12/2019 | |
| DE | 102014004059 A1 | * | 9/2015 | ............ F16F 15/021 |

(Continued)

OTHER PUBLICATIONS

International Search Report and Written Opinion, PCT/US2020/058689, dated Feb. 25, 2021.

*Primary Examiner* — Melody M Burch
(74) *Attorney, Agent, or Firm* — Master Key IP, LLP; Justin G. Sanders

(57) ABSTRACT

A vibration absorbing apparatus is disclosed for functioning as a practical mechanical metamaterial for anisotropic vibration control. In at least one embodiment, the apparatus provides a plurality of rail units positioned in a side-by-side arrangement so as to form at least one rail unit layer. Each rail unit provides a first plate and an opposing second plate slidably engaged with the first plate. The first plate provides at least one substantially linear slide rail extending therefrom. The second plate provides a corresponding at least one substantially linear slot sized for slidably receiving the corresponding at least one slide rail. At least one resilient connector extends between the first and second plates so as to maintain slidable engagement between the first and second plates. Additionally, the at least one slot of each rail unit of the at least one rail unit layer is oriented in substantially the same direction.

19 Claims, 10 Drawing Sheets

(56) References Cited

U.S. PATENT DOCUMENTS

| | | | |
|---|---|---|---|
| 4,564,219 A * | 1/1986 | Baden | B60R 22/201 |
| | | | 280/801.2 |
| 5,302,016 A * | 4/1994 | Lautenschlager | A47B 88/467 |
| | | | 292/71 |
| 6,052,955 A * | 4/2000 | Haider | A47C 21/006 |
| | | | 52/167.5 |
| 8,317,025 B1 | 11/2012 | Kolozs et al. | |
| 10,174,467 B1 | 1/2019 | Li et al. | |
| 2015/0076315 A1* | 3/2015 | Tu | F16F 15/067 |
| | | | 248/583 |
| 2016/0298300 A1* | 10/2016 | Li | F16F 7/108 |
| 2017/0044763 A1* | 2/2017 | Shu | E04H 9/0215 |
| 2018/0334825 A1* | 11/2018 | Bonessio | E04H 9/022 |

FOREIGN PATENT DOCUMENTS

| WO | 2016201109 A1 | 12/2016 | |
|---|---|---|---|
| WO | WO-2018131757 A1 * | 7/2018 | F16F 15/02 |

\* cited by examiner

VIBRATION ABSORBING METAMATERIAL APPARATUS AND ASSOCIATED METHODS

RELATED APPLICATIONS

This application claims priority and is entitled to the filing date of U.S. provisional application Ser. No. 62/931,805, filed on Nov. 7, 2019. The contents of the aforementioned application are incorporated herein by reference.

GOVERNMENT LICENSE RIGHTS

This invention was made with Government support under Grant No. 1927071, awarded by the National Science Foundation (NSF). The Government has certain rights in this invention.

BACKGROUND

The subject of this provisional patent application relates generally to mechanical metamaterials, and more particularly to a vibration absorbing apparatus configured for functioning as a practical mechanical metamaterial, along with associated methods of use and manufacture.

Applicant(s) hereby incorporate herein by reference any and all patents and published patent applications cited or referred to in this application.

By way of background, mechanical metamaterials are artificial structures (i.e., engineered materials) with mechanical properties defined by their structure rather than their composition. Additionally, such mechanical properties are often designed to have properties that are not found in nature. Mechanical metamaterials have been developed for different applications, including vibration control. Most of the mechanical materials for vibration control have either isotropic behavior—meaning that they behave in the same way in any direction of vibration—or mono-directional behavior—meaning they are designed to control vibrations in one specific direction. Some applications, however, require anisotropic vibration control—meaning a different vibration control in different directions of the vibration. One notable example of such applications is the control of seismic vibrations, in which objects may be protected by controlling the lateral vibration (i.e., in the plane of the ground undergoing seismic shaking) differently from the vertical vibration (i.e., perpendicular to the ground undergoing seismic shaking). Mechanical metamaterials with such anisotropic property have yet to be produced.

From a fabrication standpoint, large volume production of mechanical metamaterials still poses significant challenges. Due to their complex internal structure, mass-production of metamaterials is sometimes not feasible for extensive applications.

Accordingly, there exists a need for a vibration absorbing apparatus configured for functioning as a practical mechanical metamaterial for anisotropic vibration control that can be easily mass-produced for large volume and extensive applications. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a vibration absorbing apparatus configured for functioning as a practical mechanical metamaterial for anisotropic vibration control, along with associated methods of manufacture and use. In at least one embodiment, the apparatus provides a plurality of rail units positioned in a side-by-side arrangement so as to form an at least one rail unit layer. Each rail unit provides a first plate and an opposing second plate slidably engaged with the first plate. The first plate provides an at least one substantially linear slide rail extending therefrom. The second plate provides a corresponding at least one substantially linear slot sized for slidably receiving the corresponding at least one slide rail of the first plate, such that the at least one slide rail rides within the corresponding at least one slot. An at least one resilient connector extends between the first and second plates and is configured for resiliently flexing in at least one of a vertical direction and a horizontal direction so as to maintain slidable engagement between the first and second plates. Additionally, the at least one slot of each rail unit of the at least one rail unit layer is oriented in substantially the same direction.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
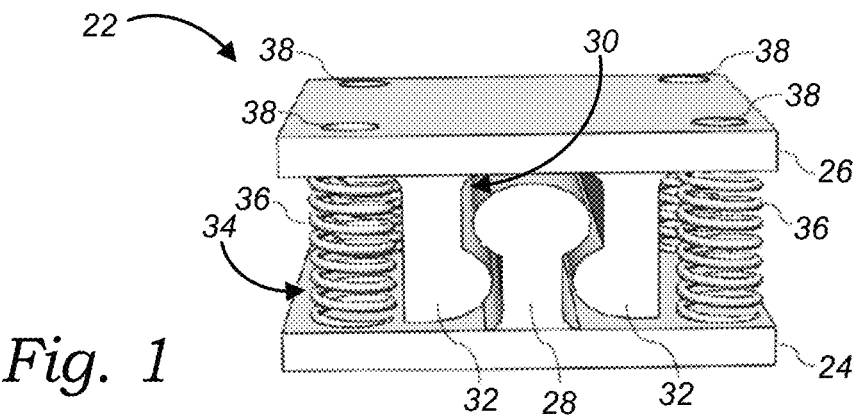
FIG. 1 is a perspective view of an exemplary rail unit of an exemplary vibration absorbing apparatus, in accordance with at least one embodiment.
Figure 23:
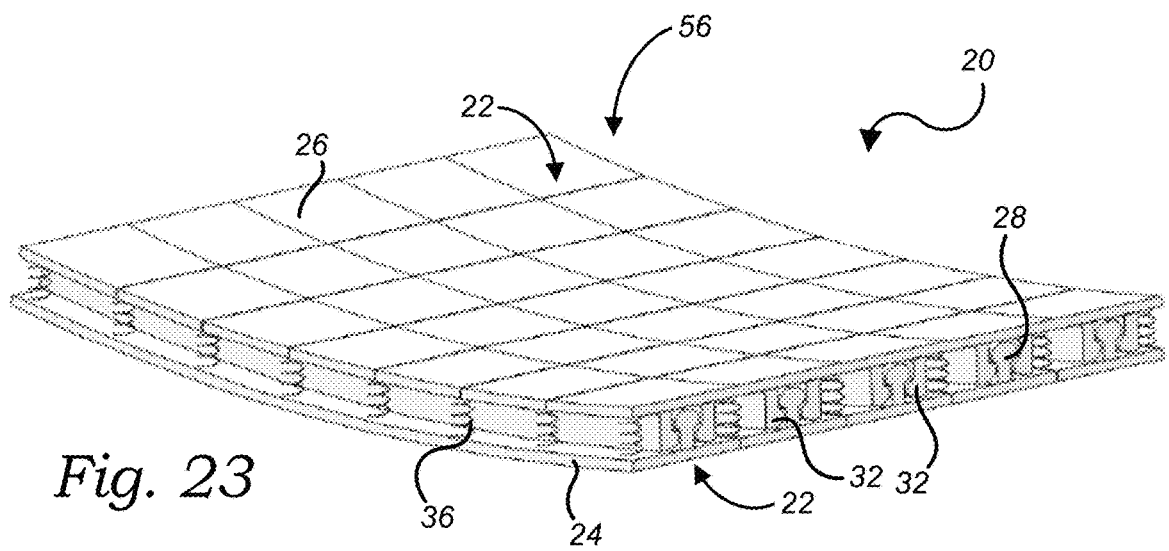
FIG. 23 is a perspective view of a plurality of further exemplary rail units in a side-by-side arrangement, in accordance with at least one embodiment.

Turning now to FIG. 1, there is shown a perspective view of an exemplary rail unit 22 of an exemplary vibration absorbing apparatus 20, in accordance with at least one embodiment. In at least one embodiment, the apparatus 20 comprises at least one rail unit 22, with each of the at least one rail unit 22 providing a first plate 24 and an opposing second plate 26 slidably engaged with the first plate 24. In at least one such embodiment, the first plate 24 provides an at least one substantially linear slide rail 28 while the second plate 26 provides a corresponding at least one substantially linear slot 30 sized for receiving the corresponding at least one slide rail 28, such that the at least one slide rail 28 rides within the corresponding at least one slot 30. In at least one embodiment, the at least one slot 30 is defined by a pair of opposing, space apart guide rails 32 provided by the second plate 26. At the outset, it should be noted that the sizes, shapes, dimensions, positions and quantities of the at least one slide rail 28 and corresponding slot 30 as depicted in the drawings (and as described herein) are merely exemplary. In further embodiments, the at least one slide rail 28 and corresponding slot 30 may take on any other sizes, shapes, dimensions, positions and/or quantities, now known or later developed, so long as the at least one rail unit 22—and, in turn, the apparatus 20 in which the at least one rail unit 22 is incorporated—is capable of substantially carrying out the functionality described herein. Similarly, the sizes, shapes and dimensions of the first and second plates 24 and 26 as depicted in the drawings (and as described herein) are merely exemplary. In further embodiments, the first and second plates 24 and 26 may take on any other sizes, shapes and/or dimensions, now known or later developed, so long as the at least one rail unit 22—and, in turn, the apparatus 20 in which the at least one rail unit 22 is incorporated—is capable of substantially carrying out the functionality described herein. In at least one such alternate embodiment, as illustrated in FIG. 23, the various components of the at least one rail unit 22 (i.e., the first and second plates 24 and 26, at least one slide rail 28, at least one slot 30 and guide rails 32, where applicable) are concavely curved longitudinally (in a direction substantially parallel with the at least one slot 30), which urges the first and second plates 24 and 26 into a neutral position, as discussed further below.

In at least one embodiment, the at least one rail unit 22 is constructed out of solid metallic materials, solid polymeric materials, solid ceramic materials, or solid composite materials. However, in further embodiments, the at least one rail unit 22 may be constructed out of any other rigid or resilient materials (or combinations of such materials), now known or later developed, so long as the at least one rail unit 22—and, in turn, the apparatus 20 in which the at least one rail unit 22 is incorporated—is capable of substantially carrying out the functionality described herein. Accordingly, the materials of construction are dependent, at least in part, on the particular context in which the apparatus 20 is to be utilized. Additionally, in at least one embodiment, the at least one rail unit 22 is produced as a nanotechnology with a length scale of 1-100 nanometers. However, in further embodiments, the at least one rail unit 22 can be produced at the meso scale or at a larger scale. Ultimately, the dimensions of the at least one rail unit 22 is dependent, at least in part, on the particular context in which the apparatus 20 is to be utilized, as well as the particular process for manufacturing the at least one rail unit 22, as discussed further below.

With continued reference to FIG. 1, in at least one embodiment, the at least one rail unit 22 provides an at least one resilient connector 34 extending between the first and second plates 24 and 26 and configured for resiliently flexing in at least one of a vertical direction and a horizontal direction so as to maintain slidable engagement between the first and second plates 24 and 26 (i.e., preventing the at least one slide rail 28 from sliding all the way out of the corresponding slot 30) while also urging the first and second plates 24 and 26 into a neutral position, wherein the first and second plates 24 and 26 are vertically aligned with one another. In that regard, it should be noted that the terms "vertically" and "vertical" are used herein to define an orientation or direction which is substantially perpendicular to the first and second plates 24 and 26, while the terms "horizontally" and "horizontal" are used herein to define an orientation or direction which is substantially parallel with the first and second plates 24 and 26 as well as with the at least one slot 30—regardless of the specific orientation of the first and second plates 24 and 26 in a given embodiment. In at least one embodiment, the at least one resilient connector 34 is further configured for maintaining the first and second plates 24 and 26 in a substantially spaced apart relationship while also providing an amount of shock absorption and vibration control between the first and second plates 24 and 26.

Figure 12:
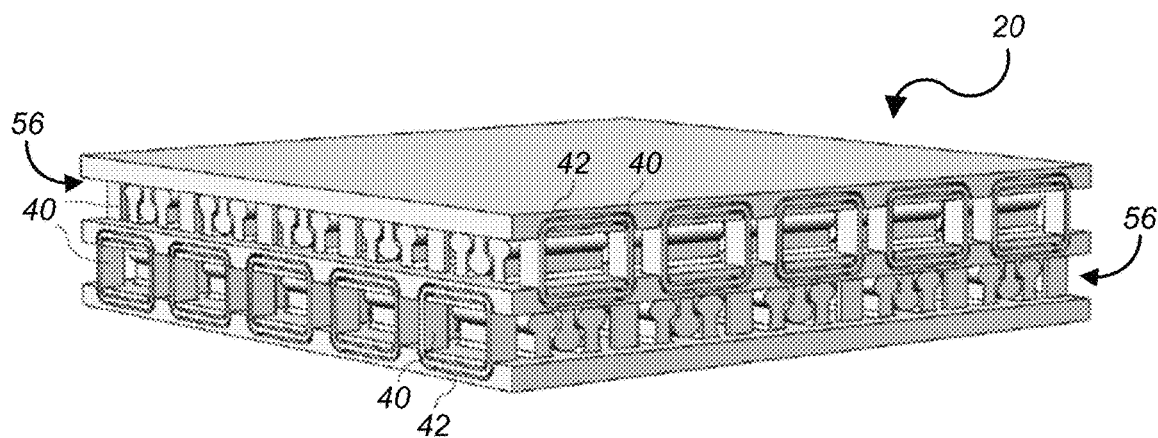
FIGS. 12 and 13 are perspective views of further exemplary embodiments of the vibration absorbing apparatus.
Figure 13:
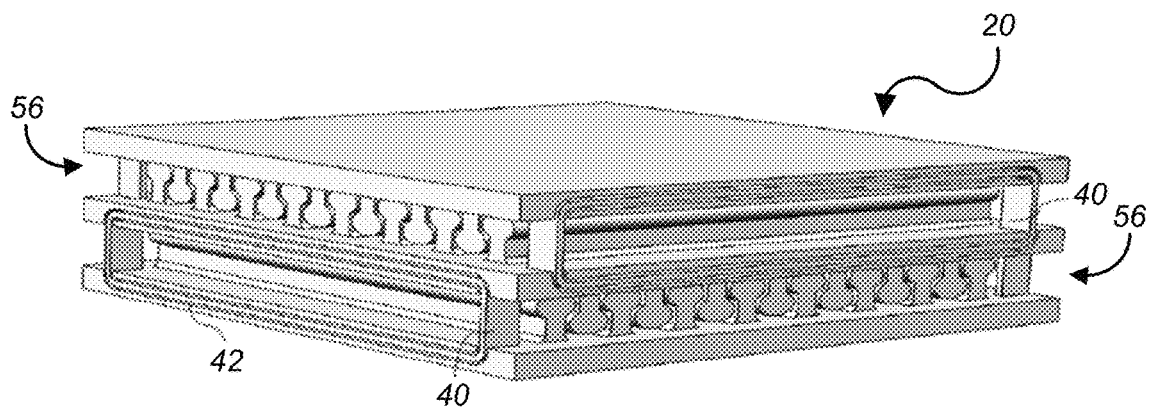

In at least one embodiment, as illustrated in FIG. 1, the at least one resilient connector 34 is a spring 36 positioned and configured such that opposing ends of the spring 36 are seated within corresponding connection apertures 38 provided by the first and second plates 24 and 26—however, in further embodiments, the spring 36 may be engaged with the first and second plates 24 and 26 using any other structure, material or mechanism, now known or later developed. In at least one alternate embodiment, as illustrated in FIGS. 12 and 13, the at least one resilient connector 34 is a resilient band 40 positioned and configured for being seated within corresponding recesses 42 provided by the first and second plates 24 and 26. In at least one such embodiment, each resilient band 40 is oriented substantially parallel with the at least one slot 30 of the corresponding rail unit 22. In still further embodiments, the at least one resilient connector 34 may be any other structure or mechanism (or combinations thereof), now known or later developed, capable of extending between the first and second plates 24 and 26 and resiliently flexing in at least one of a vertical direction and a horizontal direction so as to maintain slidable engagement between the first and second plates 24 and 26 while also urging the first and second plates 24 and 26 into a neutral position—such as rubber bands 44 (FIG. 14), for example. Thus, it should be noted that the sizes, shapes, dimensions, positions and quantities of the at least one resilient connector 34 as depicted in the drawings (and as described herein) are merely exemplary. In further embodiments, the at least one resilient connector 34 may take on any other size, shape, dimensions, position and/or quantity, now known or later developed, so long as the at least one rail unit 22—and, in turn, the apparatus 20 in which the at least one rail unit 22 is incorporated—is capable of substantially carrying out the functionality described herein.

Figure 2:
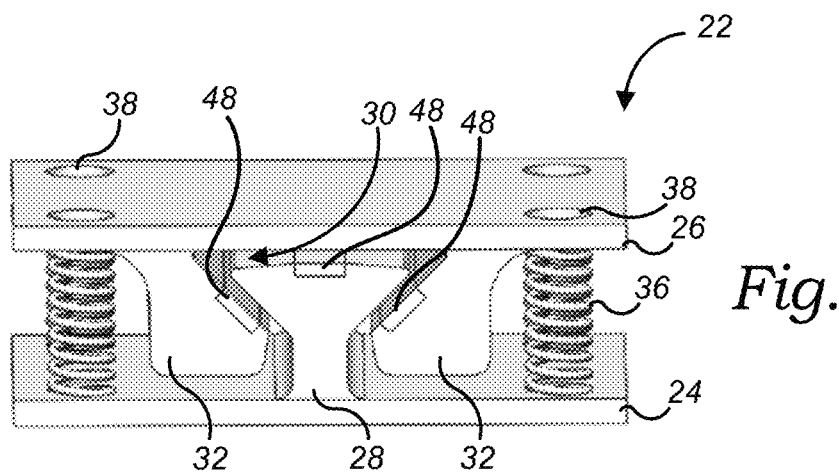
FIG. 2 is a perspective view of a further exemplary rail unit of a still further exemplary vibration absorbing apparatus, in accordance with at least one embodiment.
Figure 3:
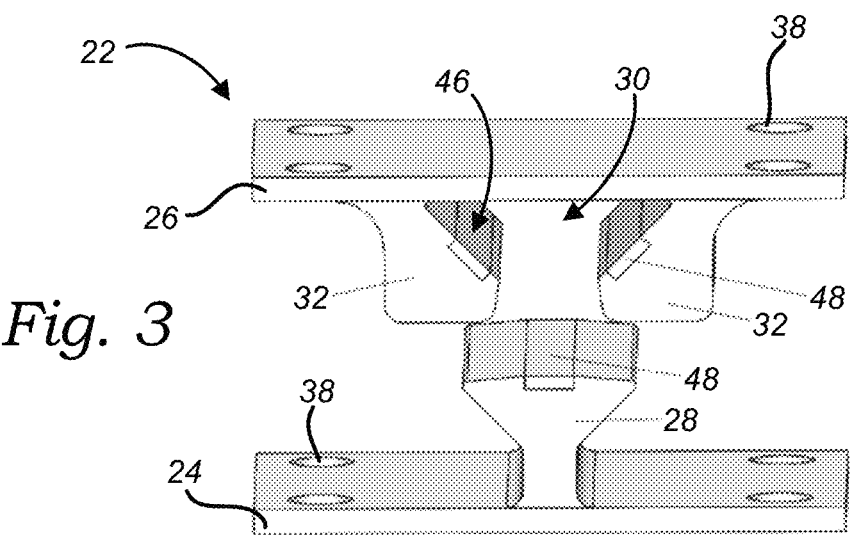
FIG. 3 is an exploded view of the rail unit of FIG. 2.
Figure 4:
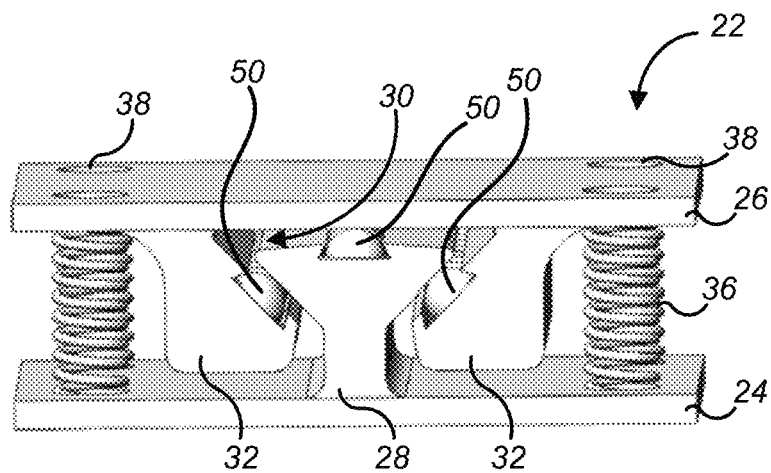
FIG. 4 is a perspective view of a still further exemplary rail unit of a still further exemplary vibration absorbing apparatus, in accordance with at least one embodiment.
Figure 5:
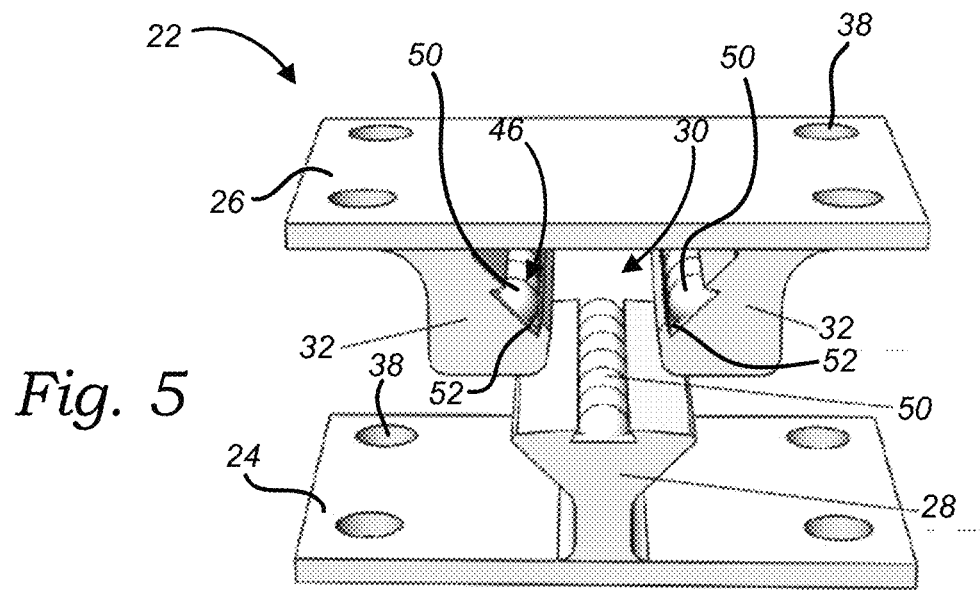
FIG. 5 is an exploded view of the rail unit of FIG. 4.
Figure 6:
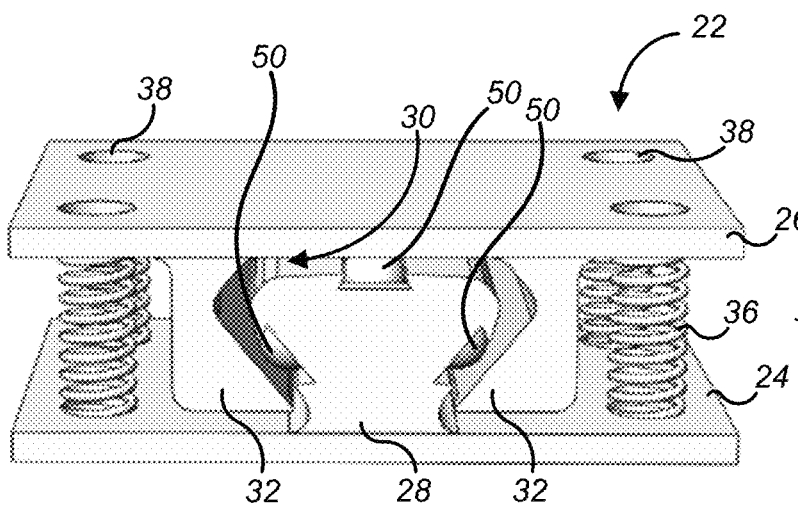
FIG. 6 is a perspective view of a still further exemplary rail unit of a still further exemplary vibration absorbing apparatus, in accordance with at least one embodiment.
Figure 7:
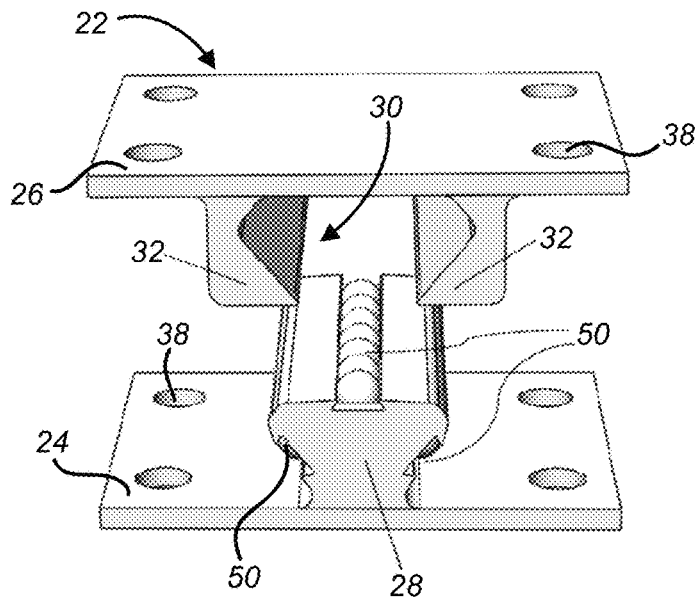
FIG. 7 is an exploded view of the rail unit of FIG. 6.
Figure 8:
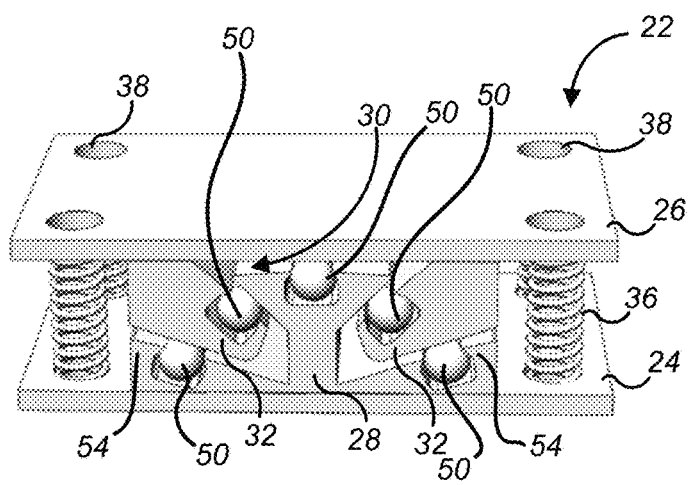
FIG. 8 is a perspective view of a still further exemplary rail unit of a still further exemplary vibration absorbing apparatus, in accordance with at least one embodiment.
Figure 9:
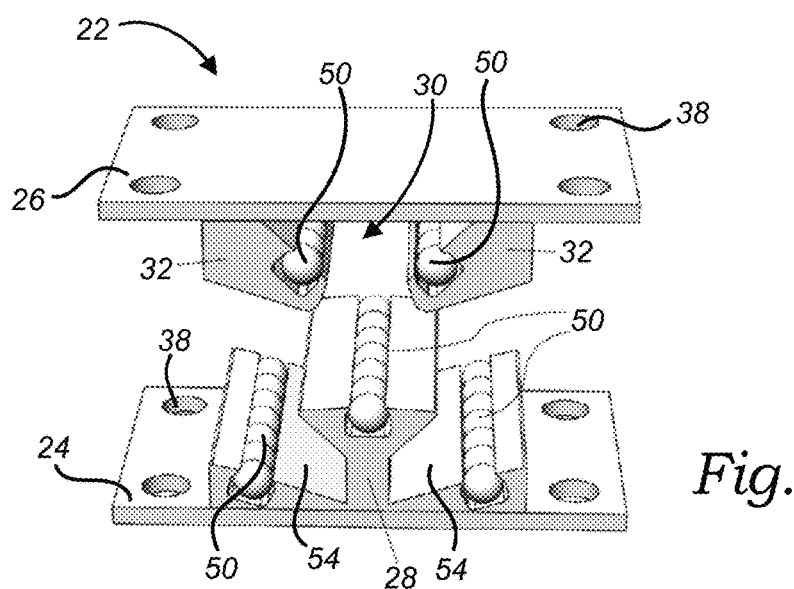
FIG. 9 is an exploded view of the rail unit of FIG. 8.

In at least one embodiment, each of the at least one slide rail 28 and corresponding guide rails 32 is constructed out of a relatively rigid material. In at least one such embodiment, the material is a relatively low-friction material, thereby assisting in the slidable engagement between the at least one slide rail 28 and the corresponding slot 30 defined by the guide rails 32. In at least one alternate embodiment, rather than being constructed out of a relatively low-friction material, each of the at least one slide rail 28 and corresponding guide rails 32 is coated or lined with a relatively low-friction material—such as TEFLON or nylon, for example. In still further alternate embodiments, at least one of the slide rail 28 and corresponding guide rails 32 provides a slide assist portion 46 positioned and configured for assisting in the slidable engagement between the at least one slide rail 28 and the corresponding slot 30 defined by the guide rails 32. In at least one such embodiment, as illustrated in FIGS. 2 and 3, the slide assist portion 46 comprises an insert 48 constructed out of a relatively low-friction material (or otherwise coated or lined with a relatively low-friction material) and positioned within one or both of the slide rail 28 and corresponding guide rails 32. In at least one further such embodiment, as illustrated in FIGS. 4 and 5, the slide assist portion 46 comprises a plurality of linearly aligned bearing balls 50 positioned within linear grooves 52 provided by one or both of the slide rail 28 and corresponding guide rails 32, with each of the grooves 52 being oriented substantially parallel with the at least one slot 30 of the corresponding rail unit 22. FIGS. 6 and 7 illustrate a further embodiment, wherein the grooves 52, along with the bearing balls 50, are positioned on multiple surfaces of the at least one slide rail 28. FIGS. 8 and 9 illustrate a still further embodiment, wherein the grooves 52, along with the bearing balls 50, are positioned within each of the slide rail 28 and corresponding guide rails 32, while additional grooves 52 and bearing balls 50 are positioned on an opposing pair of inclined surfaces 54 provided by the first plate 24 and configured for contacting the guide rails 32. In still further embodiments, the at least one slide assist portion 46 may be any other structure or mechanism, now known or later developed, capable of assisting in the slidable engagement between the at least one slide rail 28 and the corresponding slot 30 defined by the guide rails 32. Thus, it should be noted that the sizes, shapes, dimensions, positions and quantities of the at least one slide assist portion 46 as depicted in the drawings (and as described herein) are merely exemplary. In further embodiments, the at least one slide assist portion 46 may take on any other size, shape, dimensions, position and/or quantity, now known or later developed, so long as the at least one rail unit 22—and, in turn, the apparatus 20 in which the at least one rail unit 22 is incorporated—is capable of substantially carrying out the functionality described herein.

Figure 10:
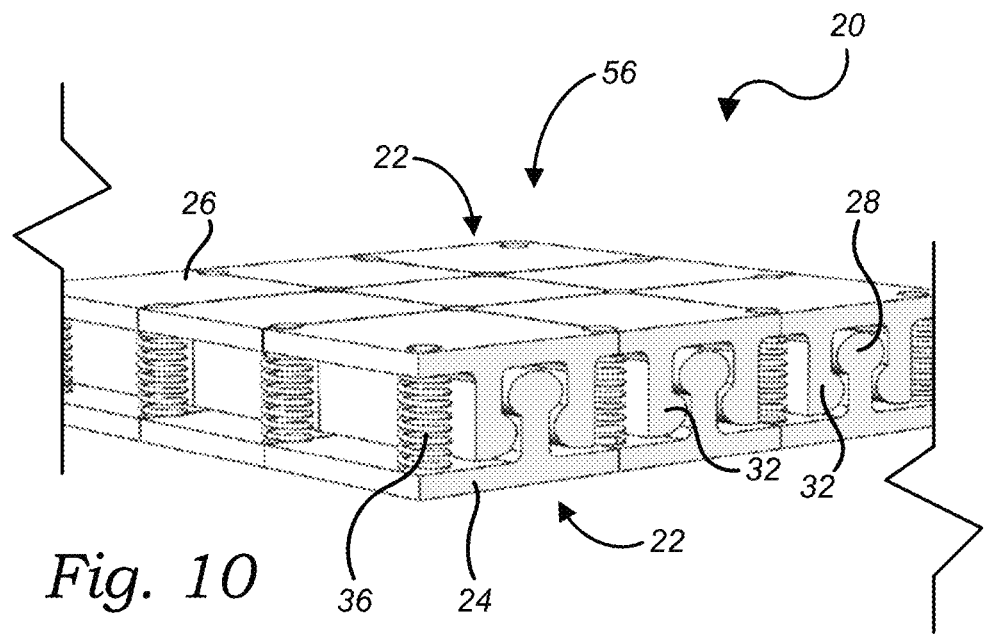
FIG. 10 is a partial perspective view of a plurality of rail units of FIG. 1 in a side-by-side arrangement, in accordance with at least one embodiment.

In at least one embodiment, as illustrated in FIG. 10, the apparatus 20 comprises a plurality of rail units 22 positioned in a side-by-side arrangement, with the at least one slot 30 of each rail unit 22 being oriented in substantially the same direction. For illustrative purposes, a plurality of rail units 22 positioned in a side-by-side arrangement is referred to herein as a "rail unit layer" 56. Thus, in at least one embodiment, the slots 30 of the rail unit layer 56 (i.e., the slots 30 of the rail units 22 that make up the larger rail unit layer 56) are all oriented in substantially the same direction. In at least one embodiment, the resilient connectors 34 of each rail unit 22 are shared with one or more of the immediately adjacent rail units 22. In at least one embodiment, the first and second plates 24 and 26 of each rail unit 22 are secured to or otherwise engaged with the respective first and second plates 24 and 26 of the adjacent rail unit 22. In at least one alternate embodiment, the first and second plates 24 and 26 of each rail unit 22 are integral with the respective first and second plates 24 and 26 of the adjacent rail unit 22, such that the rail unit layer 56 comprises a single first plate 24 and a single opposing second plate 26—i.e., a single, large rail unit 22 comprising a plurality of slide rails 28 and corresponding slots 30, along with a plurality of resilient connectors 34 (as illustrated in FIGS. 12 and 13). The size of the rail unit layer 56—and, in turn, the number of rail units 22 making up the rail unit layer 56—is dependent, at least in part, on the context in which the apparatus 20 is to be utilized. Thus, the size, shape and dimensions of the rail unit layer 56 as depicted in the drawings (and as described herein) are merely exemplary. In further embodiments, the rail unit layer 56 may take on any other size, shape and/or dimensions, now known or later developed, so long as the apparatus 20 is capable of substantially carrying out the functionality described herein. In at least one such alternate embodiment, as illustrated in FIG. 23, the various components of each rail unit 22 (i.e., the first and second plates 24 and 26, at least one slide rail 28, at least one slot 30 and guide rails 32, where applicable)—and, in turn, the resulting rail unit layer 56—are concavely curved longitudinally (in a direction substantially parallel with the at least one slot 30), which urges the first and second plates 24 and 26 into the neutral position.

Figure 11:
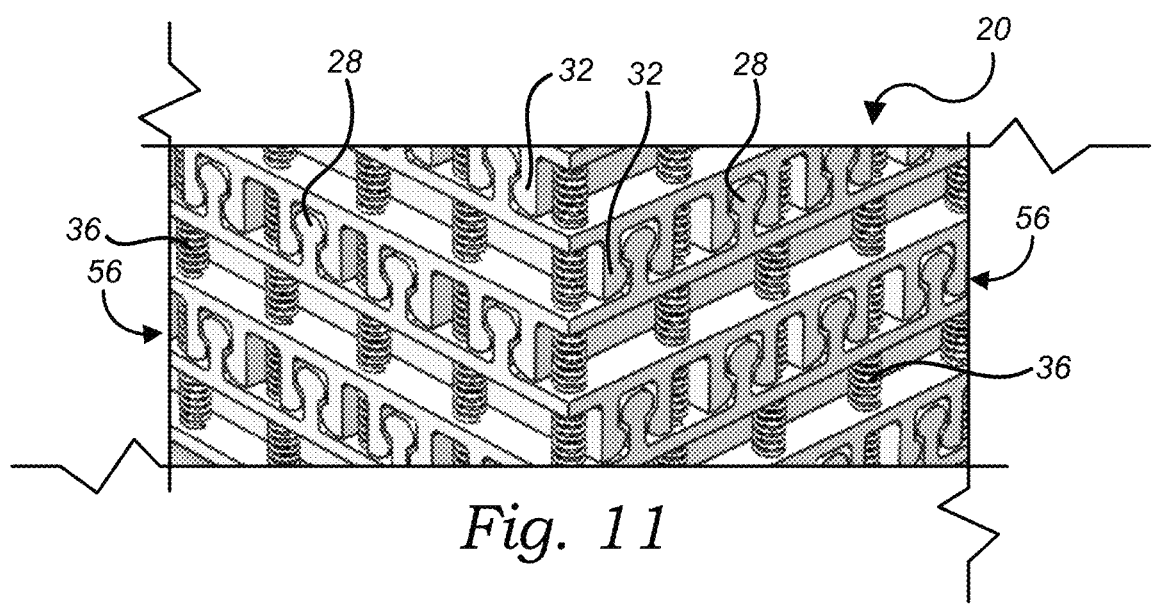
FIG. 11 is a partial perspective view of a plurality of rail units of FIG. 1 in both a side-by-side and vertically stacked arrangement, in accordance with at least one embodiment.

In at least one embodiment, as illustrated in FIG. 11, the apparatus 20 comprises a plurality of rail unit layers 56 positioned in a vertically stacked arrangement. In at least one embodiment, the rail unit layers 56 are oriented such that the slots 30 (along with the slide rails 28) of a given rail unit layer 56 are oriented in a different direction than the slots 30 (along with the slide rails 28) of each immediately adjacent rail unit layer 56. In at least one such embodiment, as illustrated in FIG. 11, the slots 30 (along with the slide rails 28) of each rail unit layer 56 are oriented in a direction substantially transverse to the direction of the slots 30 (along with the slide rails 28) of each immediately adjacent rail unit layer 56. In still further embodiments, any other relative directions for the respective slots 30 (along with the slide rails 28) may be utilized from one rail unit layer 56 to the next rail unit layer 56. In at least one embodiment, the resilient connectors 34 of each rail unit layer 56 are vertically aligned from one rail unit layer 56 to the next. In at least one embodiment, the first plate 24 of a given rail unit layer 56 is secured to or otherwise engaged with the second plate 26 of the immediately adjacent rail unit layer 56. In at least one alternate such embodiment, as illustrated in FIG. 11, the first plate 24 of a given rail unit layer 56 is integral with (or otherwise one and the same as) the second plate 26 of the immediately adjacent rail unit layer 56, with the at least one slide rail 28 of the first plate 24 extending outwardly from the first plate 24 in a direction substantially opposite to the direction of the guide rails 32 of the second plate 26 of the immediately adjacent rail unit layer 56. In at least one embodiment (not shown), the first plate 24 of a given rail unit layer 56 is secured to or otherwise engaged with the first plate 24 of the immediately adjacent rail unit layer 56, while the second plate 26 of the rail unit layer 56 is secured to or otherwise engaged with the second plate 26 of the other immediately adjacent rail unit layer 56. In at least one alternate such embodiment (also not shown), the first plate 24 of a given rail unit layer 56 is integral with (or otherwise one and the same as) the first plate 24 of the immediately adjacent rail unit layer 56—with the at least one slide rail 28 of the first plate 24 extending outwardly from the first plate 24 in a direction substantially opposite to the direction of the at least one slide rail 28 of the first plate 24 of the immediately adjacent rail unit layer 56—and the second plate 26 of the rail unit layer 56 is integral with (or otherwise one and the same as) the second plate 26 of the other immediately adjacent rail unit layer 56—with the guide rails 32 of the second plate 26 extending outwardly from the second plate 26 in a direction substantially opposite to the direction of the guide rails 32 of the second plate 26 of the immediately adjacent rail unit layer 56. The size of the apparatus 20—including the size of each rail unit layer 56 and the number of rail unit layers 56 vertically stacked on one another—is dependent, at least in part, on the context in which the apparatus 20 is to be utilized. Thus, the size, shape and dimensions of the rail unit layers 56 as depicted in the drawings (and as described herein), along with the quantity and relative positions of rail unit layers 56 vertically stacked on one another, are merely exemplary. In further embodiments, the rail unit layers 56 may take on any other size, shape, dimensions, positions and/or quantities, now known or later developed, so long as the apparatus 20 is capable of substantially carrying out the functionality described herein.

In at least one embodiment, where the apparatus 20 comprises a plurality of rail unit layers 56, each of the rail unit layers 56 may optionally provide different properties or characteristics—i.e., modulus of elasticity, shear modulus, ultimate vertical, lateral and longitudinal force and deformation of the metamaterial, etc.—relative to one or more of the other rail unit layers 56. Such differences in properties or characteristics could be achieved through the incorporation of different first or second plates 24 or 26 (i.e., different sizes, shapes, dimensions, materials of construction, etc.), different resilient connectors 34 (i.e., different types, sizes, shapes, dimensions, materials of construction, quantities, relative positions, etc.), etc. for a given rail unit 22, or for each rail unit 22 in a given rail unit layer 56. By optimizing the structure of each rail unit layer 56—and potentially each individual rail unit 22—effective metamaterial parameters may be achieved for the apparatus 20, thereby enabling the apparatus to achieve anisotropic vibration control properties, such as the those required by seismic vibration control through seismic isolation. Most notable properties for seismic isolation are high vertical bearing capacity and stiffness, and large lateral and longitudinal deformation with a moderate restoring force.

Figure 14:
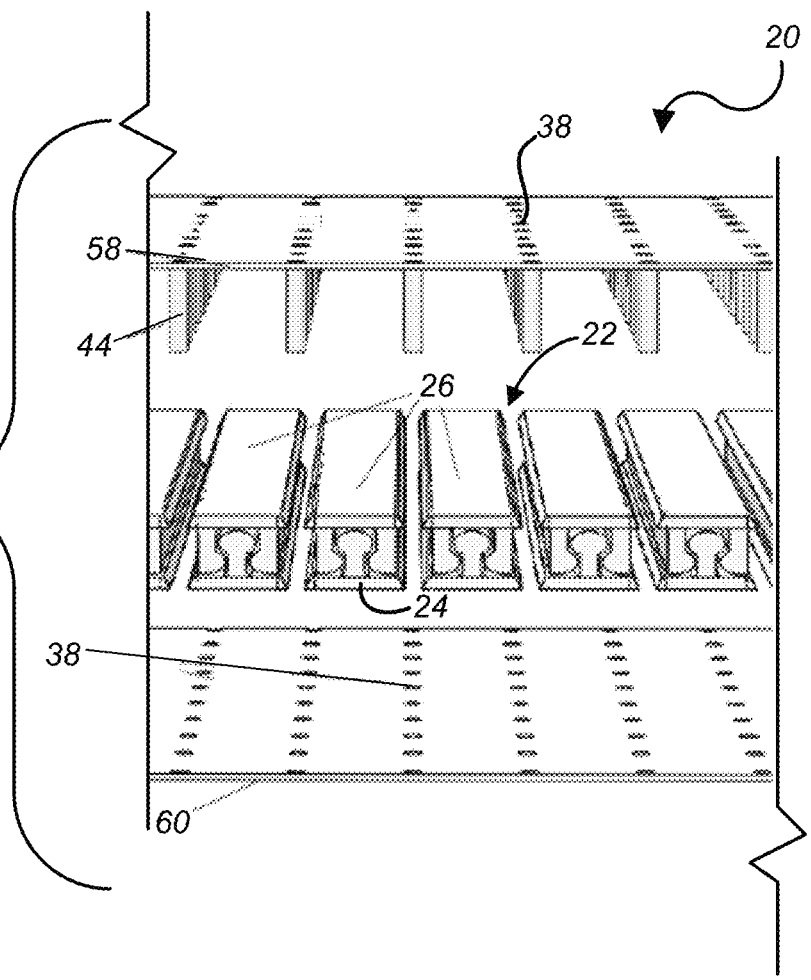
FIGS. 14 and 15 are partial perspective views of a still further exemplary embodiment of the vibration absorbing apparatus, in accordance with at least one embodiment.
Figure 15:
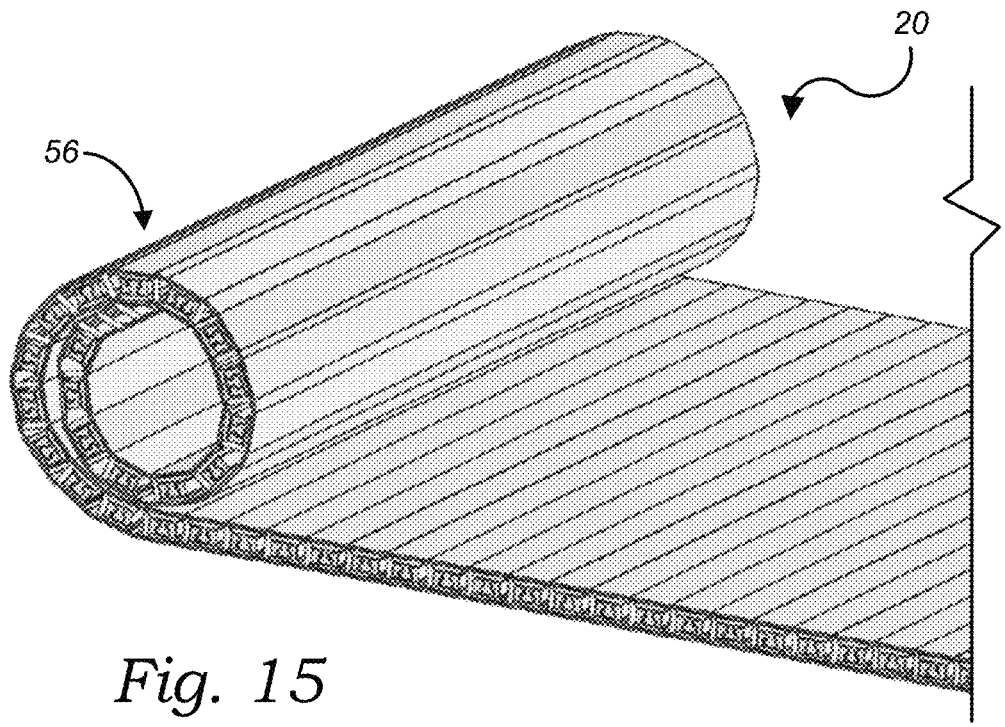

In at least one still further embodiment, as illustrated in FIGS. 14 and 15, the individual rail units 22 of a given rail unit layer 56 are flexibly connected to one another or otherwise spaced apart from one another. Additionally, in such embodiments, the apparatus 20 further provides a first fabrication grid 58 and an opposing second fabrication grid 60 positioned and configured for sandwiching the rail unit layer 56 therebetween (as discussed further below), with each of the first fabrication grid 58 and second fabrication grid 60 being constructed out of a relatively resilient, flexible material. Accordingly, in such embodiments, the apparatus 20 is capable of folding or otherwise rolling up on itself, as illustrated in FIG. 15. It should be noted that the sizes, shapes and dimensions of the first and second fabrication grids 58 and 60 as depicted in the drawings (and as described herein) are merely exemplary. In further embodiments, the first and second fabrication grids 58 and 60 may take on any other sizes, shapes and/or dimensions, now known or later developed, (including being solid plates, in at least one embodiment) so long as the apparatus 20 is capable of substantially carrying out the functionality described herein.

In at least one embodiment, the apparatus 20 is capable of providing a scalable, practical, cost-effective mechanical metamaterial for seismic vibration control that may fabricated in mass-producible volumes. There are a number of different possible processes for manufacturing the apparatus 20—dependent, at least in part, on the particular context in which the apparatus 20 is to be utilized and, in turn, the size, shape and dimensions of each of the underlying rail units 22 that make up the apparatus 20.

Figure 16:
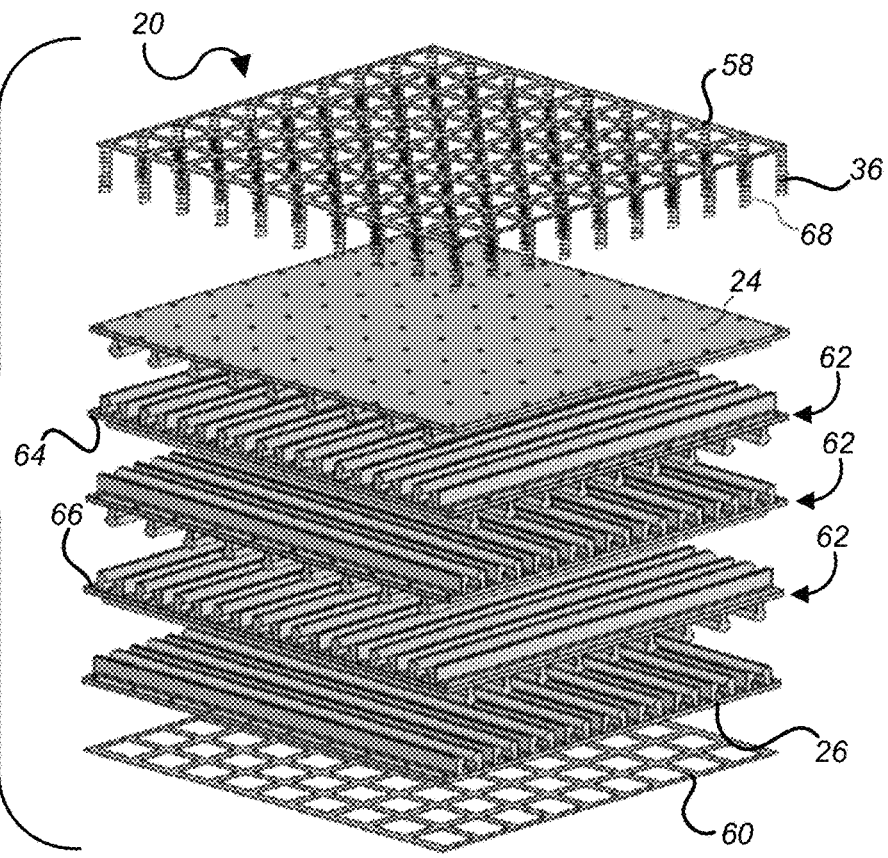
FIGS. 16-19 are perspective views illustrating an exemplary process for manufacturing the apparatus of FIG. 11, in accordance with at least one embodiment.
Figure 17:
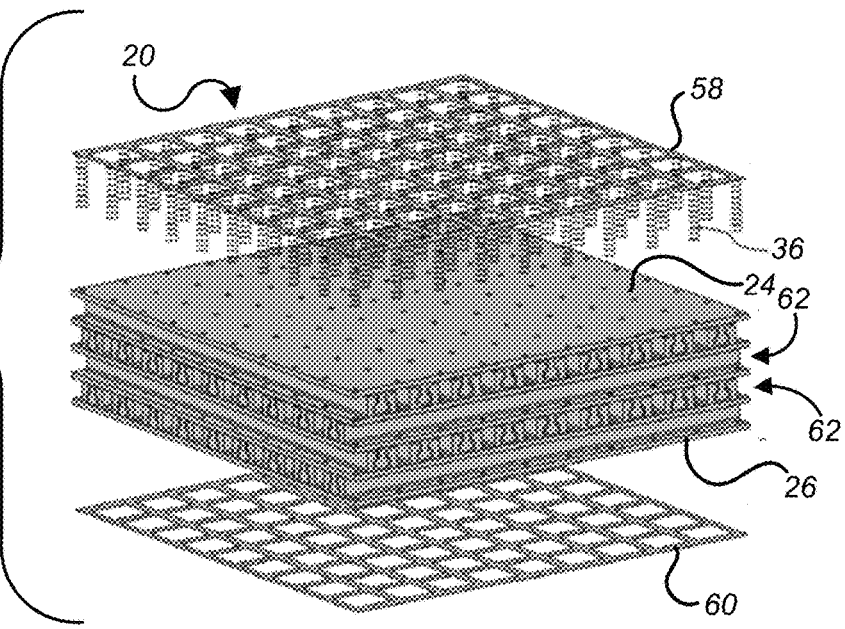
Figure 18:
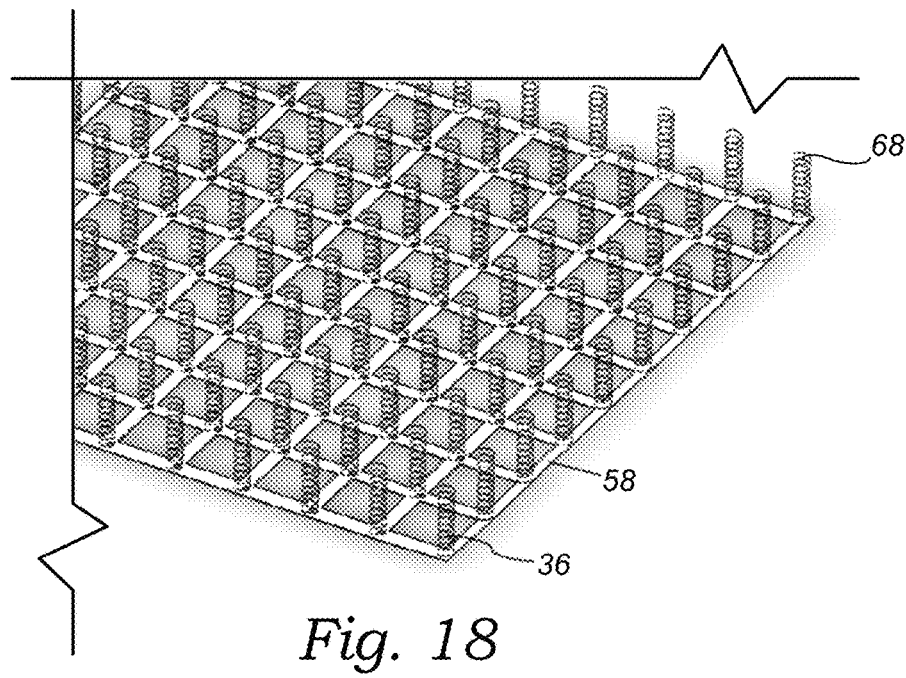
Figure 19:
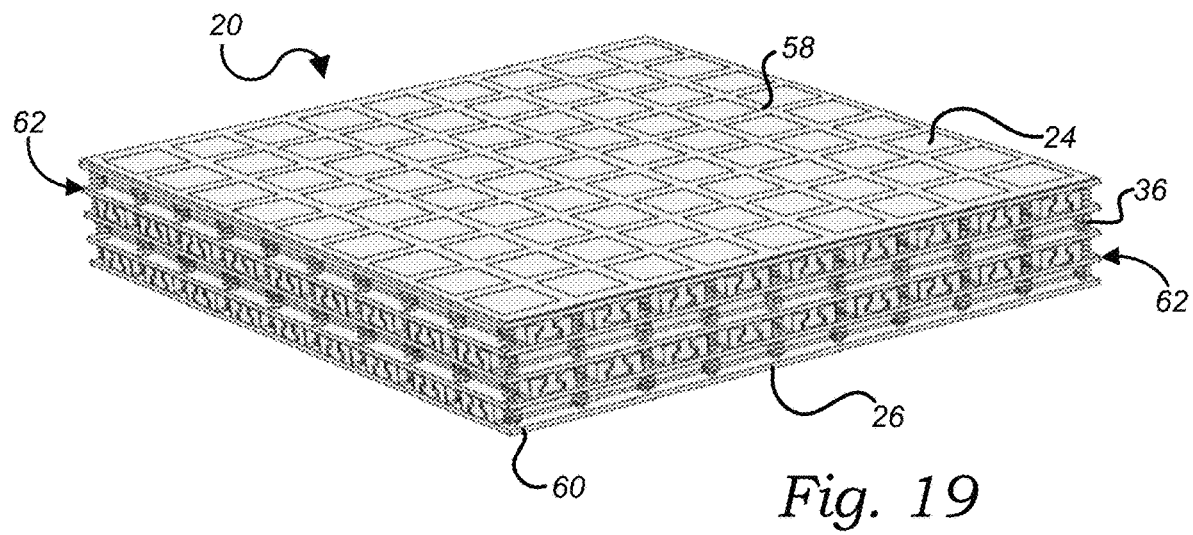

In at least one embodiment, as illustrated in FIGS. 16-19, the apparatus 20 may be manufactured as an assembly of subcomponents. In a bit more detail, in at least one such embodiment, such subcomponents include the first plate 24 (providing a plurality of spaced apart, substantially parallel slide rails 28), the second plate 26 (providing a plurality of spaced apart, substantially parallel slots 30, with each slot 30 being linearly aligned with a respective one of the slide rails 28), and one or more central plates 62 positioned between the first and second plates 24 and 26. A first surface 64 of each central plate 62 provides a plurality of spaced apart, substantially parallel slide rails 28, similar to the first plate 24; and an opposing second surface 66 of each central plate 62 provides a plurality of spaced apart, substantially parallel slots 30, similar to the second plate 26. In at least one embodiment, the central plates 62 are oriented such that the slots 30 (along with the slide rails 28) of a given central plate 62 are oriented in a different direction than the slots 30 (along with the slide rails 28) of each immediately adjacent central plate 62. In at least one such embodiment, as illustrated in FIGS. 16, 17 and 19, the slots 30 (along with the slide rails 28) of each central plate 62 are oriented in a direction substantially transverse to the direction of the slots 30 (along with the slide rails 28) of each immediately adjacent central plate 62. In still further embodiments, any other relative directions for the respective slots 30 (along with the slide rails 28) may be utilized from one central plate 62 to the next central plate 62. In at least one embodiment, each of the first plate 24, second plate 26, and central plates 62 provides a plurality of connection apertures 38 linearly aligned with one another, between the spaced apart slots 30, and extending through the respective first plate 24, second plate 26 and central plates 62. Each set of connection apertures 38 is positioned and configured for allowing a one of the resilient connectors 34 to extend therethrough, thereby assisting to hold the first plate 24, second plate 26 and central plates 62 together. Accordingly, in at least one such embodiment, each of the resilient connectors 34 has a length that is substantially equal to an overall thickness of the apparatus 20. In at least one embodiment, the apparatus 20 comprises a further subcomponent by way of a first fabrication grid 58 and an opposing second fabrication grid 60, such that the first plate 24, second plate 26 and central plates 62 are sandwiched between the first and second fabrication grids 58 and 60 during manufacturing. In a bit more detail, in at least one such embodiment, as illustrated in FIGS. 16 and 17, each of the resilient connectors 34 is connected to the first fabrication grid 58 (FIG. 18), such that when the first fabrication grid 58 is brought into contact with the first plate 24, the resilient connectors 34 are able to extend through the appropriate connection apertures 38 of each of the first plate 24, second plate 26 and central plates 62, with a free end 68 of each resilient connector 34 subsequently engaging with the second fabrication grid 60 (FIG. 19). In at least one embodiment, after the apparatus 20 has been assembled, the first and second fabrication grids 58 and 60 are removed. In one alternate embodiment, the first and second fabrication grids 58 and 60 remain permanently engaged. In at least one embodiment, prior to the first and second fabrication grids 58 and 60 being moved into position, each of the first plate 24, second plate 26 and central plates 62 are slidably engaged with one another by slidably inserting the respective slide rails 28 into the respective slots 30. In such embodiments, the quantity of central plates 62 to be incorporated into the apparatus 20 is dependent on the desired thickness of the apparatus 20.

Figure 20:
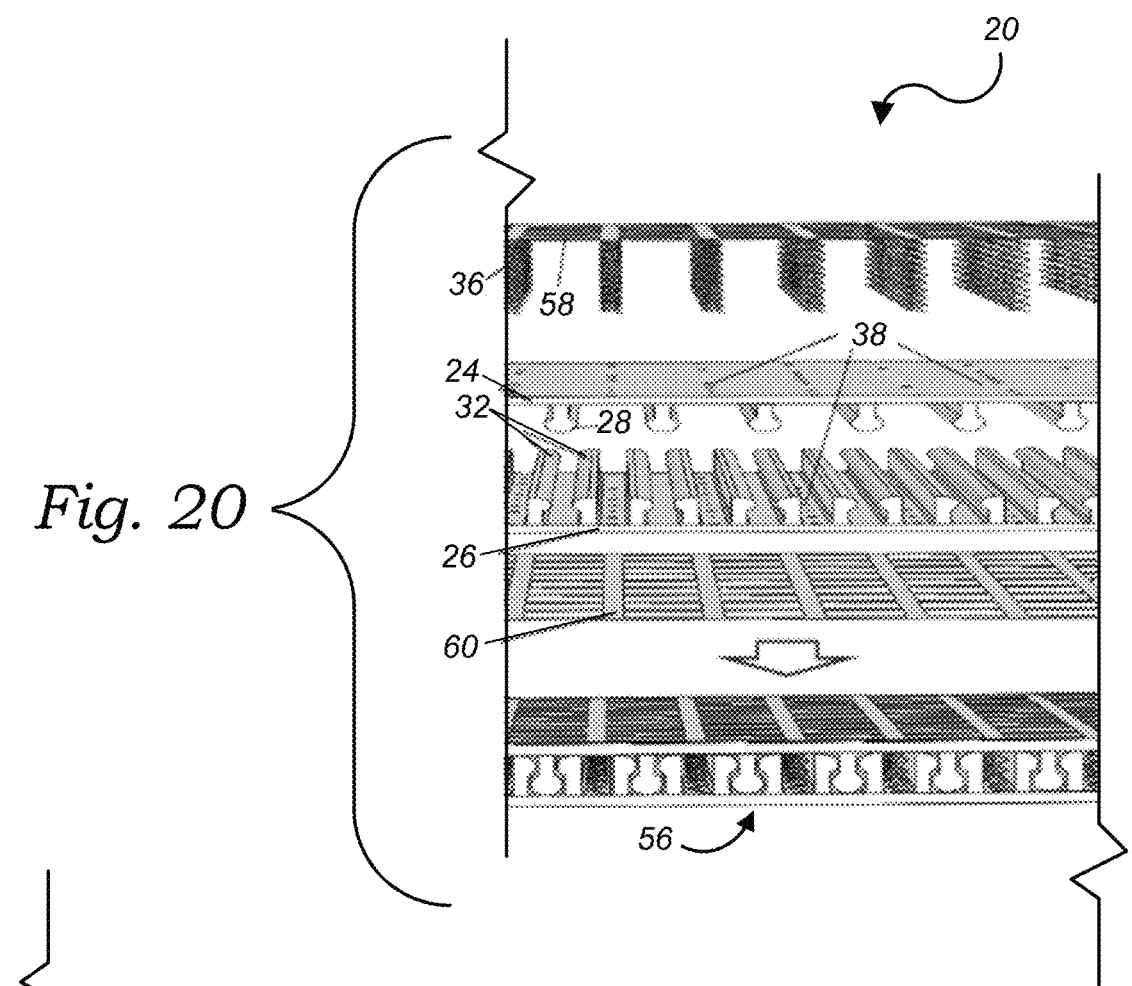
FIGS. 20 and 21 are partial perspective views illustrating a further exemplary process for manufacturing the apparatus of FIG. 11, in accordance with at least one embodiment.
Figure 21:
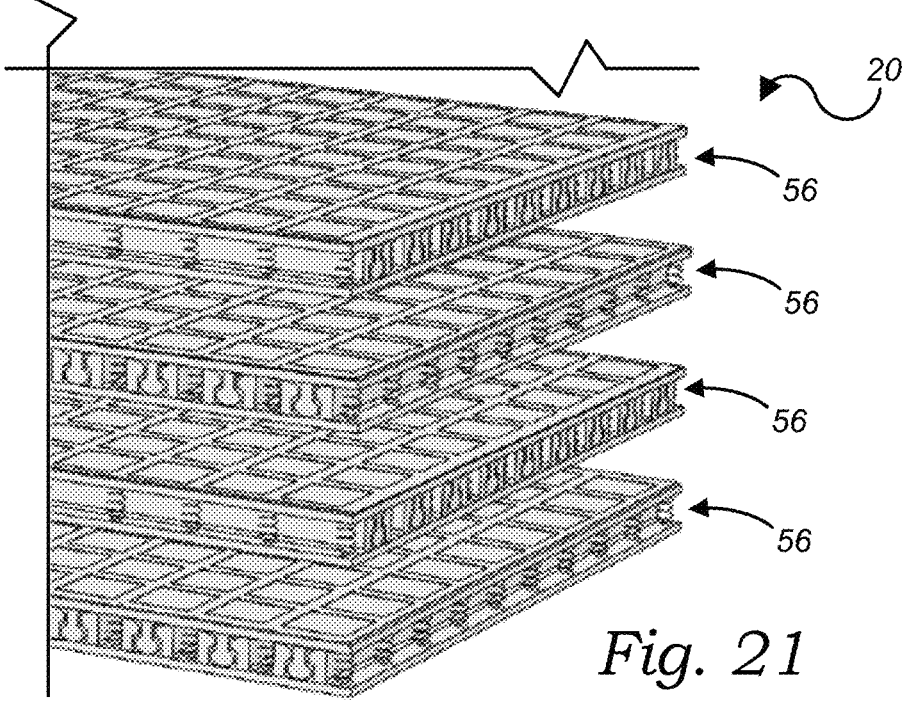

In at least one alternate embodiment, as illustrated in FIGS. 20 and 21, the apparatus 20 may be manufactured as an assembly of rail unit layers 56, such that each rail unit layer 56 may be fabricated by assembling its subcomponents. In a bit more detail, in at least one such embodiment, each rail unit layer 56 comprises the first plate 24 and the second plate 26, along with first and second fabrication grids 58 and 60 configured for sandwiching the first and second plates 24 and 26 therebetween. Additionally, in at least one such embodiment, the first and second plates 24 and 26 each provides a plurality of connection apertures 38 linearly aligned with one another, between the spaced apart slots 30, and extending through the respective first and second plates 24 and 26, with each set of connection apertures 38 being positioned and configured for allowing a one of the resilient connectors 34 to extend therethrough, thereby assisting to hold the first and second plates 24 and 26 together. Accordingly, in at least one such embodiment, each of the resilient connectors 34 has a length that is substantially equal to an overall thickness of the associated rail unit layer 56. In at least one such embodiment, as illustrated in FIG. 20, each of the resilient connectors 34 is connected to the first fabrication grid 58, such that when the first fabrication grid 58 is brought into contact with the first plate 24, the resilient connectors 34 are able to extend through the appropriate connection apertures 34 of each of the first and second plates 24 and 26, with the free end 68 of each resilient connector 34 subsequently engaging with the second fabrication grid 60. In at least one embodiment, after the apparatus 20 has been assembled, the first and second fabrication grids 58 and 60 are removed. In one alternate embodiment, the first and second fabrication grids 58 and 60 remain permanently engaged. In at least one embodiment, prior to the first and second fabrication grids 58 and 60 being moved into position, the first and second plates 24 and 26 are slidably engaged with one another by slidably inserting the respective slide rails 28 into the respective slots 30. As discussed above, in at least one embodiment, as illustrated in FIG. 21, when the apparatus 20 incorporates more than one rail unit layer 56, the rail unit layers 56 are oriented such that the slots 30 (along with the slide rails 28) of a given rail unit layer 56 are oriented in a different direction than the slots 30 (along with the slide rails 28) of each immediately adjacent rail unit layer 56. In still further embodiments, any other relative directions for the respective slots 30 (along with the slide rails 28) may be utilized from one rail unit layer 56 to the next rail unit layer 56. Additionally, as also discussed above, in at least one embodiment, the first plate 24 of a given rail unit layer 56 is secured to or otherwise engaged with the second plate 26 of the immediately adjacent rail unit layer 56 using fasteners, adhesives, bonding agents, or any other appropriate technique now known or later developed. In at least one alternate such embodiment, the first plate 24 of a given rail unit layer 56 is integral with (or otherwise one and the same as) the second plate 26 of the immediately adjacent rail unit layer 56, with the slide rails 28 of the first plate 24 extending in a direction substantially opposite to the direction of the guide rails 32 of the second plate 26 of the immediately adjacent rail unit layer 56. In at least one embodiment, the first plate 24 of a given rail unit layer 56 is secured to or otherwise engaged with the first plate 24 of the immediately adjacent rail unit layer 56, while the second plate 26 of the rail unit layer 56 is secured to or otherwise engaged with the second plate 26 of the other immediately adjacent rail unit layer 56. In at least one alternate such embodiment, the first plate 24 of a given rail unit layer 56 is integral with (or otherwise one and the same as) the first plate 24 of the immediately adjacent rail unit layer 56—with the slide rails 28 of the first plate 24 extending in a direction substantially opposite to the direction of the slide rails 28 of the first plate 24 of the immediately adjacent rail unit layer 56—and the second plate 26 of the rail unit layer 56 is integral with (or otherwise one and the same as) the second plate 26 of the other immediately adjacent rail unit layer 56—with the guide rails 32 of the second plate 26 extending in a direction substantially opposite to the direction of the guide rails 32 of the second plate 26 of the immediately adjacent rail unit layer 56. In such embodiments, the quantity of rail unit layers 56 to be incorporated into the apparatus 20 is dependent on the desired thickness of the apparatus 20.

Figure 22:
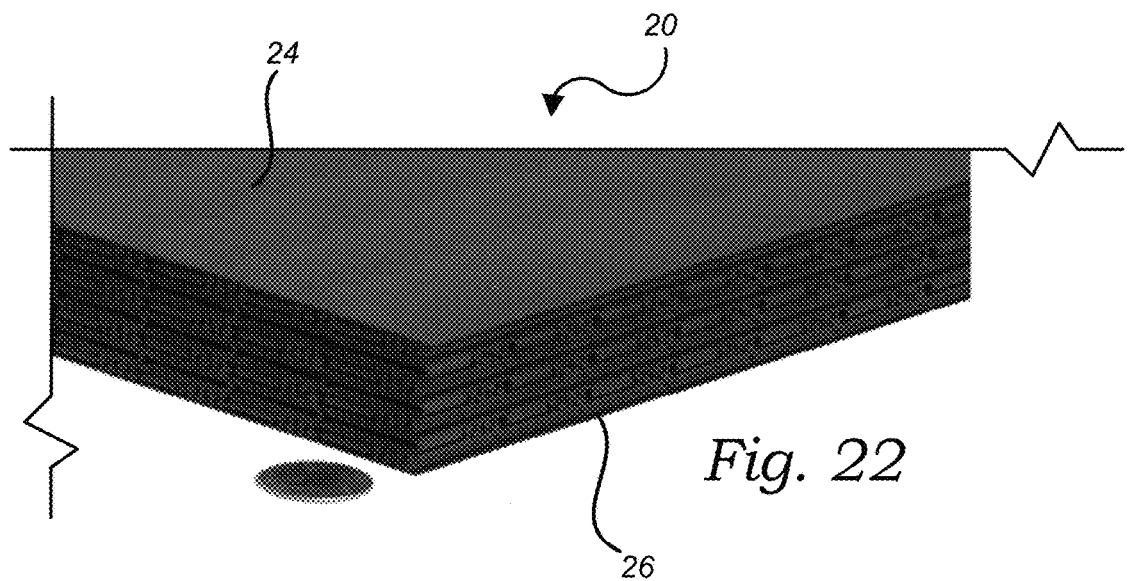
FIG. 22 is a partial perspective view illustrating a still further exemplary process for manufacturing the apparatus of FIG. 11, in accordance with at least one embodiment.

In at least one further alternate embodiment, as illustrated in FIG. 22, the entire apparatus 20 may be manufactured as a whole through additive manufacturing. In a bit more detail, in at least one such embodiment, additive manufacturing processes such as vat photopolymerization, direct energy deposition, material jetting, material extrusion, and powder bed fusion could be utilized. Thus, in at least one such embodiment, a pad may be printed with one printing direction. Support materials may be used during the fabrication and may be removed in post-processing. Rail units 22, resilient connectors 34, and first and second plates 24 and 26 (along with central plates 62, where applicable) may be 3D printed with the same material. In at least one alternate embodiment, the rail units 22, resilient connectors 34, and first and second plates 24 and 26 (along with central plates 62, where applicable) may be 3D printed using different materials. Specifically, springs 36 (or resilient bands 40) may be printed with relatively soft or flexible materials, while slide rails 28 and guide rails 32 may be printed with relatively hard materials. In at least one embodiment, the first and second plates 24 and 26 (along with central plates 62, where applicable) may be printed with a relatively soft or flexible material—such as the same material used for the resilient bands 40, for example. In at least one alternate embodiment, the first and second plates 24 and 26 (along with central plates 62, where applicable) may be printed with a relatively hard material—such as the same material used for the slide rails 28 and guide rails 32, for example.

In still further embodiments, the apparatus 20 may be fabricated through hybrid additive manufacturing processes, which could combine select additive manufacturing methods with other traditional methods (such as computer numerical control, for example) in order to have a single-step manufacturing process for rail units 22, or rail unit layers 56, consisting of both soft and hard materials. Specifically, in such embodiments, the additive manufacturing processes may utilize direct energy deposition for steel materials or material extrusion for plastic materials; computer numerical control machining could be utilized for material cutting and smoothing of rigid surfaces (layer by layer) with the aim of reducing the additive manufacturing printed surface texture that has been widely characterized as detrimental to fatigue life; and syringe injection could be utilized for pouring soft materials.

Aspects of the present specification may also be described as the following embodiments:

1. A vibration absorbing apparatus configured for functioning as a practical mechanical metamaterial for anisotropic vibration control, the apparatus comprising: a plurality of rail units positioned in a side-by-side arrangement so as to form an at least one rail unit layer, each rail unit comprising: a first plate providing an at least one substantially linear slide rail extending therefrom; an opposing second plate slidably engaged with the first plate, the second plate providing a corresponding at least one substantially linear slot sized for slidably receiving the corresponding at least one slide rail of the first plate, such that the at least one slide rail rides within the corresponding at least one slot; and an at least one resilient connector extending between the first and second plates and configured for resiliently flexing in at least one of a vertical direction and a horizontal direction so as to maintain slidable engagement between the first and second plates; wherein, the at least one slot of each rail unit of the at least one rail unit layer is oriented in substantially the same direction.

2. The vibration absorbing apparatus according to embodiment 1, wherein the at least one slot of each rail unit is defined by a pair of spaced apart, substantially linear guide rails extending from the second plate of said rail unit.

3. The vibration absorbing apparatus according to embodiments 1-2, wherein each of the at least one slide rail and corresponding guide rails of each rail unit is constructed out of a relatively rigid material.

4. The vibration absorbing apparatus according to embodiments 1-3, wherein the relatively rigid material is a relatively low-friction material, thereby assisting in the slidable engagement between the at least one slide rail and the corresponding slot defined by the guide rails.

5. The vibration absorbing apparatus according to embodiments 1-4, wherein each of the at least one slide rail and corresponding guide rails of each rail unit is coated or lined with a relatively low-friction material.

6. The vibration absorbing apparatus according to embodiments 1-5, wherein at least one of the slide rail and corresponding guide rails of each rail unit provides a slide assist portion positioned and configured for assisting in the slidable engagement between the at least one slide rail and the corresponding slot defined by the guide rails.

7. The vibration absorbing apparatus according to embodiments 1-6, wherein the slide assist portion comprises an insert constructed out of a relatively low-friction material, or otherwise coated or lined with a relatively low-friction material, and positioned within one or both of the slide rail and corresponding guide rails.

8. The vibration absorbing apparatus according to embodiments 1-7, wherein the slide assist portion comprises a plurality of linearly aligned bearing balls positioned within an at least one linear groove provided by one or both of the slide rail and corresponding guide rails, with each of the grooves being oriented substantially parallel with the at least one slot of the corresponding rail unit.

9. The vibration absorbing apparatus according to embodiments 1-8, wherein the slide assist portion further comprises a plurality of linearly aligned bearing balls positioned within a pair of additional linear grooves provided by an opposing pair of inclined surfaces provided by the first plate and configured for contacting the guide rails, with each of the additional grooves being oriented substantially parallel with the at least one slot of the corresponding rail unit.

10. The vibration absorbing apparatus according to embodiments 1-9, wherein the at least one resilient connector of each rail unit is shared with one or more of the immediately adjacent rail units, thereby securing each rail unit with one or more of the immediately adjacent rail units.

11. The vibration absorbing apparatus according to embodiments 1-10, wherein the at least one resilient connector is a spring.

12. The vibration absorbing apparatus according to embodiments 1-11, wherein the at least one spring is positioned and configured such that opposing ends of the spring are seated within corresponding connection apertures provided by the first and second plates.

13. The vibration absorbing apparatus according to embodiments 1-12, wherein the at least one resilient connector is a resilient band positioned and configured for being seated within corresponding recesses provided by the first and second plates.

14. The vibration absorbing apparatus according to embodiments 1-13, wherein each of the at least one resilient band is oriented substantially parallel with the at least one slot of the corresponding rail unit.

15. The vibration absorbing apparatus according to embodiments 1-14, wherein the first and second plates of each rail unit of the rail unit layer are secured to or otherwise engaged with the respective first and second plates of the at least one adjacent rail unit.

16. The vibration absorbing apparatus according to embodiments 1-15, wherein the first and second plates of each rail unit of the rail unit layer are integral with the respective first and second plates of the at least one adjacent rail unit.

17. The vibration absorbing apparatus according to embodiments 1-16, further comprising a plurality of rail unit layers positioned in a vertically stacked arrangement.

18. The vibration absorbing apparatus according to embodiments 1-17, wherein the rail unit layers are oriented such that the slots of a given rail unit layer are oriented in a different direction than the slots of each immediately adjacent rail unit layer.

19. The vibration absorbing apparatus according to embodiments 1-18, wherein the slots of each rail unit layer are oriented in a direction substantially transverse to the direction of the slots of each immediately adjacent rail unit layer.

20. The vibration absorbing apparatus according to embodiments 1-19, wherein the resilient connectors of the rail units of each rail unit layer are vertically aligned from one rail unit layer to the next.

21. The vibration absorbing apparatus according to embodiments 1-20, wherein the resilient connectors extend through each of the rail unit layers via corresponding linearly aligned connection apertures provided by each of the first and second plates of each of the rail units of each of the rail unit layers.

22. The vibration absorbing apparatus according to embodiments 1-21, wherein the first plate of each rail unit of a given rail unit layer is secured to or otherwise engaged with the second plate of each rail unit of the immediately adjacent rail unit layer.

23. The vibration absorbing apparatus according to embodiments 1-22, wherein the first plate of each rail unit of a given rail unit layer is integral with the second plate of each rail unit of the immediately adjacent rail unit layer.

24. The vibration absorbing apparatus according to embodiments 1-23, wherein: the first plate of each rail unit of a given rail unit layer is secured to or otherwise engaged with the first plate of each rail unit of the immediately adjacent rail unit layer; and the second plate of each rail unit of said rail unit layer is secured to or otherwise engaged with the second plate of an opposing immediately adjacent rail unit layer.

25. The vibration absorbing apparatus according to embodiments 1-24, wherein: the first plate of each rail unit of a given rail unit layer is integral with the first plate of each rail unit of the immediately adjacent rail unit layer; and the second plate of each rail unit of said rail unit layer is integral with the second plate of an opposing immediately adjacent rail unit layer.

26. The vibration absorbing apparatus according to embodiments 1-25, further comprising a first fabrication grid and an opposing second fabrication grid positioned and configured for sandwiching the rail unit layer therebetween.

27. The vibration absorbing apparatus according to embodiments 1-26, wherein: the first and second plates of each rail unit of the rail unit layer are flexibly connected to or otherwise spaced apart from the respective first and second plates of the at least one adjacent rail unit; and each of the first fabrication grid and second fabrication grid is constructed out of a relatively resilient, flexible material; whereby, the apparatus is capable of folding or otherwise rolling up on itself.

28. The vibration absorbing apparatus according to embodiments 1-27, wherein the at least one rail unit layer is concavely curved longitudinally, in a direction substantially parallel with the at least one slot of each rail unit of said rail unit layer.

29. A vibration absorbing apparatus configured for functioning as a practical mechanical metamaterial for anisotropic vibration control, the apparatus comprising: a plurality of rail units positioned in a side-by-side arrangement so as to form an at least one rail unit layer, each rail unit comprising: a first plate providing an at least one substantially linear slide rail extending therefrom; an opposing second plate slidably engaged with the first plate, the second plate providing a corresponding at least one pair of spaced apart, substantially linear guide rails extending therefrom, each pair of guide rails cooperating to define a substantially linear slot sized for slidably receiving the corresponding at least one slide rail of the first plate, such that the at least one slide rail rides within the corresponding at least one slot; and an at least one resilient connector extending between the first and second plates and configured for resiliently flexing in at least one of a vertical direction and a horizontal direction so as to maintain slidable engagement between the first and second plates; wherein, the at least one slot of each rail unit of the at least one rail unit layer is oriented in substantially the same direction.

30. A vibration absorbing apparatus configured for functioning as a practical mechanical metamaterial for anisotropic vibration control, the apparatus comprising: a plurality of rail unit layers positioned in a vertically stacked arrangement, each rail unit layer comprising a plurality of rail units positioned in a side-by-side arrangement, each rail unit comprising: a first plate providing an at least one substantially linear slide rail extending therefrom; an opposing second plate slidably engaged with the first plate, the second plate providing a corresponding at least one substantially linear slot sized for slidably receiving the corresponding at least one slide rail of the first plate, such that the at least one slide rail rides within the corresponding at least one slot; and an at least one resilient connector extending between the first and second plates and configured for resiliently flexing in at least one of a vertical direction and a horizontal direction so as to maintain slidable engagement between the first and second plates; wherein, the at least one slot of each rail unit of the at least one rail unit layer is oriented in substantially the same direction; further wherein, the rail unit layers are oriented such that the slots of the rail units of a given rail unit layer are oriented in a different direction than the slots of the rail units of each immediately adjacent rail unit layer.

In closing, regarding the exemplary embodiments of the present invention as shown and described herein, it will be appreciated that a vibration absorbing apparatus is disclosed and configured for functioning as a practical mechanical metamaterial for anisotropic vibration control. Because the principles of the invention may be practiced in a number of configurations beyond those shown and described, it is to be understood that the invention is not in any way limited by the exemplary embodiments, but is generally directed to a vibration absorbing apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that the logic code, programs, modules, processes, methods, and the order in which the respective elements of each method are performed are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A vibration absorbing apparatus configured for functioning as a practical mechanical metamaterial for anisotropic vibration control, the apparatus comprising:
    a plurality of rail units positioned in a side-by-side arrangement so as to form an at least one rail unit layer, each rail unit comprising:
        a first plate providing an at least one substantially linear slide rail extending therefrom;
        an opposing second plate slidably engaged with the first plate, the second plate providing a corresponding at least one substantially linear slot sized for slidably receiving the corresponding at least one slide rail of the first plate, such that the at least one slide rail rides within the corresponding at least one slot in a direction parallel with each of first and second plates; and
        an at least one resilient connector extending directly between the first and second plates in a substantially perpendicular direction relative to the first and second plates, the at least one resilient connector configured for resiliently flexing in at least one of a vertical direction and a horizontal direction so as to maintain slidable engagement between the first and second plates;
        wherein, the at least one slot of each rail unit of the at least one rail unit layer is oriented in substantially the same direction; and
    wherein, the at least one resilient connector of each rail unit is shared with one or more of the immediately adjacent rail units, thereby securing each rail unit with one or more of the immediately adjacent rail units.

2. The vibration absorbing apparatus of claim 1, wherein the at least one slot of each rail unit is defined by a pair of spaced apart, substantially linear guide rails extending from the second plate of said rail unit.

3. The vibration absorbing apparatus of claim 2, wherein at least one of the at least one slide rail and corresponding guide rails of each rail unit provides a slide assist portion positioned and configured for assisting in the slidable engagement between the at least one slide rail and the corresponding slot defined by the guide rails.

4. The vibration absorbing apparatus of claim 3, wherein the slide assist portion comprises an insert constructed out of a relatively low-friction material, or otherwise coated or lined with a relatively low-friction material, and positioned within one or both of the at least one slide rail and corresponding guide rails.

5. The vibration absorbing apparatus of claim 3, wherein the slide assist portion comprises a plurality of linearly aligned bearing balls positioned within an at least one linear groove provided by one or both of the at least one slide rail and corresponding guide rails, with each of the grooves being oriented substantially parallel with the at least one slot of the corresponding rail unit.

6. The vibration absorbing apparatus of claim 1, wherein the at least one resilient connector is a spring.

7. The vibration absorbing apparatus of claim 1, wherein the at least one resilient connector is a resilient band positioned and configured for being seated within corresponding recesses provided by the first and second plates.

8. The vibration absorbing apparatus of claim 1, wherein the first and second plates of each rail unit of the at least one rail unit layer are secured to or otherwise engaged with the respective first and second plates of the at least one adjacent rail unit.

9. The vibration absorbing apparatus of claim 1, wherein the first and second plates of each rail unit of the at least one rail unit layer are integral with the respective first and second plates of the at least one adjacent rail unit.

10. The vibration absorbing apparatus of claim 1, further comprising a plurality of rail unit layers positioned in a vertically stacked arrangement.

11. The vibration absorbing apparatus of claim 10, wherein the rail unit layers are oriented such that the slots of a given rail unit layer are oriented in a different direction than the slots of each immediately adjacent rail unit layer.

12. The vibration absorbing apparatus of claim 10, wherein the resilient connectors of the rail units of each rail unit layer are vertically aligned from one rail unit layer to the next.

13. The vibration absorbing apparatus of claim 12, wherein the resilient connectors extend through each of the rail unit layers via corresponding linearly aligned connection apertures provided by each of the first and second plates of each of the rail units of each of the rail unit layers.

14. The vibration absorbing apparatus of claim 10, wherein the first plate of each rail unit of a given rail unit layer is secured to or otherwise engaged with the second plate of each rail unit of the immediately adjacent rail unit layer.

15. The vibration absorbing apparatus of claim 10, wherein the first plate of each rail unit of a given rail unit layer is integral with the second plate of each rail unit of the immediately adjacent rail unit layer.

16. The vibration absorbing apparatus of claim 1, further comprising a first fabrication grid and an opposing second fabrication grid positioned and configured for sandwiching the at least one rail unit layer therebetween.

17. The vibration absorbing apparatus of claim 16, wherein:
    the first and second plates of each rail unit of the at least one rail unit layer are flexibly connected to or otherwise spaced apart from the respective first and second plates of the at least one adjacent rail unit; and
    each of the first fabrication grid and second fabrication grid is constructed out of a relatively resilient, flexible material;
    whereby, the apparatus is capable of folding or otherwise rolling up on itself.

18. A vibration absorbing apparatus configured for functioning as a practical mechanical metamaterial for anisotropic vibration control, the apparatus comprising:
    a plurality of rail units positioned in a side-by-side arrangement so as to form an at least one rail unit layer, each rail unit comprising:
        a first plate providing an at least one substantially linear slide rail extending therefrom;
        an opposing second plate slidably engaged with the first plate, the second plate providing a corresponding at least one substantially linear slot sized for slidably receiving the corresponding at least one slide rail of the first plate, such that the at least one slide rail rides within the corresponding at least one slot; and an at least one resilient connector extending between the first and second plates and configured for resiliently flexing in at least one of a vertical direction and a horizontal direction so as to maintain slidable engagement between the first and second plates;

wherein, the at least one slot of each rail unit of the at least one rail unit layer is oriented in substantially the same direction;

a first fabrication grid and an opposing second fabrication grid positioned and configured for sandwiching the at least one rail unit layer therebetween, each of the first fabrication grid and second fabrication constructed out of a relatively resilient, flexible material;

wherein, the first and second plates of each rail unit of the at least one rail unit layer are flexibly connected to or otherwise spaced apart from the respective first and second plates of the at least one adjacent rail unit, thereby enabling the apparatus to fold or otherwise roll up on itself; and wherein, the at least one resilient connector of each rail unit is shared with one or more of the immediately adjacent rail units.

19. A vibration absorbing apparatus configured for functioning as a practical mechanical metamaterial for anisotropic vibration control, the apparatus comprising:

a plurality of rail layers positioned in a vertically stacked arrangement, each rail unit layer comprising a plurality of rail units positioned in a side-by-side arrangement, each rail unit comprising:

a first plate providing an at least one substantially linear slide rail extending therefrom;

an opposing second plate slidably engaged with the first plate, the second plate providing a corresponding at least one substantially linear slot sized for slidably receiving the corresponding at least one slide rail of the first plate, such that the at least one slide rail rides within the corresponding at least one slot; and an at least one resilient connector extending directly between the first and second plates and configured for resiliently flexing in at least one of a vertical direction and a horizontal direction so as to maintain slidable engagement between the first and second plates;

wherein, the at least one slot of each rail unit of the at least one rail unit layer is oriented in substantially the same direction;

wherein, the at least one resilient connector of each rail unit is shared with one or more of the immediately adjacent rail units, thereby securing each rail unit with one or more of the immediately adjacent rail units;

wherein, the resilient connectors of the rail units of each rail unit layer are vertically aligned from one rail unit layer to the next; and wherein, the resilient connectors extend through each of the rail unit layers via corresponding linearly aligned connection apertures provided by each of the first and second plates of each of the rail units of each of the rail unit layers.

\* \* \* \* \*